(12) United States Patent
Tsai et al.

(10) Patent No.: US 11,703,918 B2
(45) Date of Patent: Jul. 18, 2023

(54) ELECTRONIC DEVICE

(71) Applicant: InnoLux Corporation, Miao-Li County (TW)

(72) Inventors: Tsung-Han Tsai, Miao-Li County (TW); Kuan-Feng Lee, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 82 days.

(21) Appl. No.: 17/365,088

(22) Filed: Jul. 1, 2021

(65) Prior Publication Data

US 2021/0325944 A1    Oct. 21, 2021

Related U.S. Application Data

(63) Continuation of application No. 16/233,319, filed on Dec. 27, 2018, now abandoned.

(51) Int. Cl.
| | |
|---|---|
| *G06F 1/16* | (2006.01) |
| *H01Q 1/36* | (2006.01) |
| *H01Q 1/06* | (2006.01) |
| *H01Q 1/22* | (2006.01) |

(52) U.S. Cl.
CPC ............ *G06F 1/1698* (2013.01); *H01Q 1/06* (2013.01); *H01Q 1/2258* (2013.01); *H01Q 1/36* (2013.01)

(58) Field of Classification Search
None
See application file for complete search history.

(56) References Cited

U.S. PATENT DOCUMENTS

| | | | |
|---|---|---|---|
| 6,744,213 B2* | 6/2004 | Wilcoxson | H01J 37/321 |
| | | | 315/111.41 |
| 10,381,335 B2* | 8/2019 | Sasaki | H01L 25/075 |
| 2016/0093940 A1* | 3/2016 | Pan | H01Q 1/243 |
| | | | 455/277.1 |
| 2017/0179168 A1* | 6/2017 | Suzuki | G02F 1/133553 |
| 2019/0278130 A1* | 9/2019 | Lim | H01L 27/3225 |

FOREIGN PATENT DOCUMENTS

WO    WO-2018188259 A1 * 10/2018    ............. G06F 3/017

OTHER PUBLICATIONS

Cheng-WO_2018-188259A1.pdf (Year: 2018).*

* cited by examiner

*Primary Examiner* — Marisol Figueroa
*Assistant Examiner* — Alexander J Yi
(74) *Attorney, Agent, or Firm* — McClure, Qualey & Rodack, LLP

(57) ABSTRACT

An electronic modulating device is provided. The electronic modulating device includes a substrate, a plurality of first modulating electrodes disposed on the substrate, and a plurality of second modulating electrodes disposed on the substrate. The area of one of the first modulating electrodes is greater than the area of one of the second modulating electrodes. The ratio of the number of first modulating electrodes to the number of second modulating electrodes is in a range from 0.5 to 2.0.

16 Claims, 11 Drawing Sheets

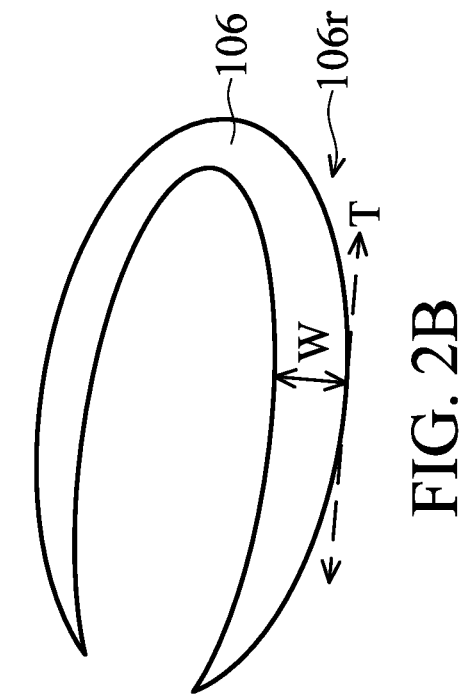
FIG. 2A
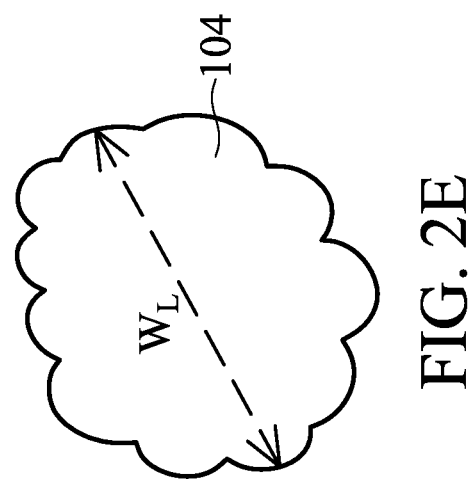
FIG. 2B
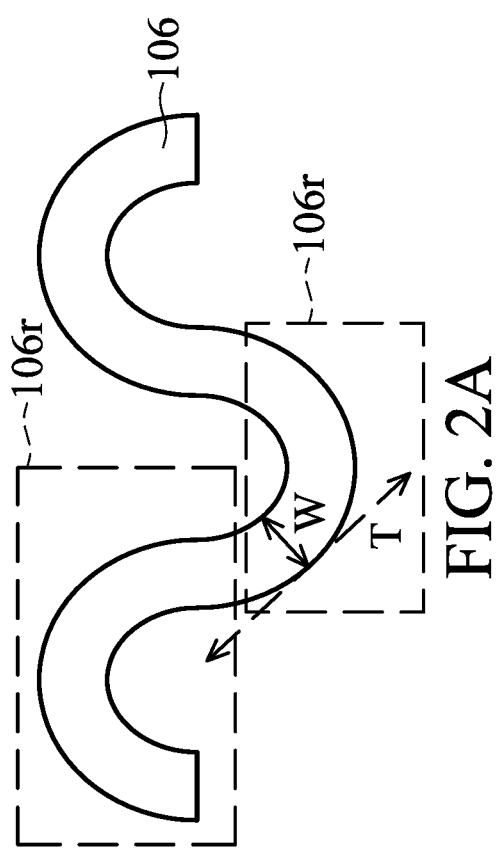
FIG. 2C
FIG. 2D
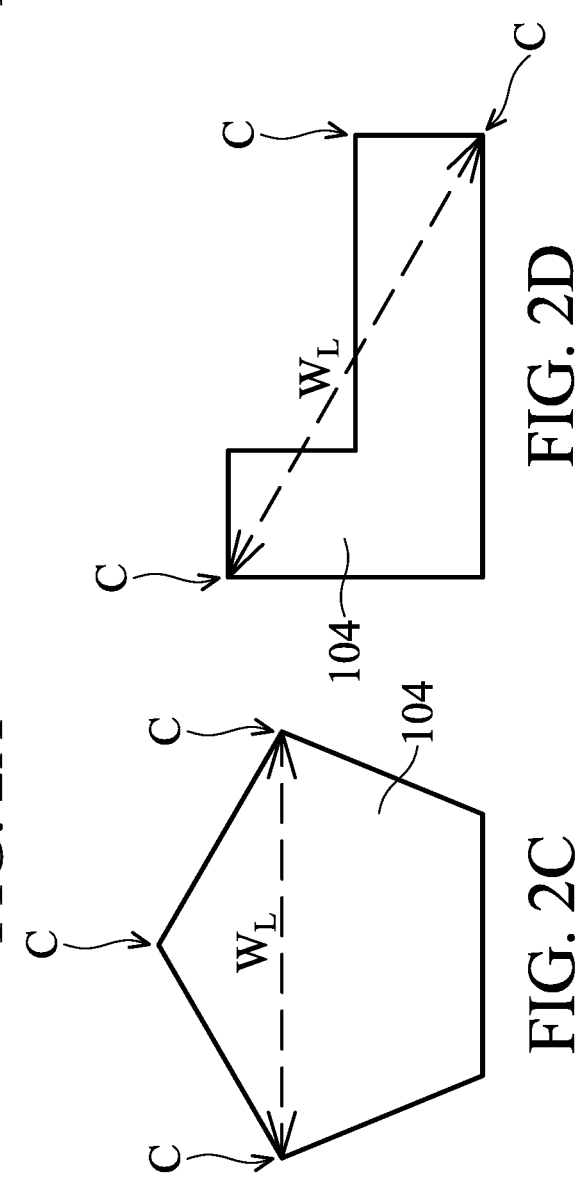
FIG. 2E

ELECTRONIC DEVICE

CROSS REFERENCE TO RELATED APPLICATIONS

This application is a Continuation of pending U.S. patent application Ser. No. 16/233,319, filed Dec. 27, 2018 and entitled "ELECTRONIC DEVICE", the entirety of which is incorporated by reference herein.

BACKGROUND

Technical Field

The present disclosure relates to an electronic device, and in particular it relates to the arrangement of an antenna in an electronic device.

Description of the Related Art

Electronic products that include a display panel, such as smartphones, tablets, notebook computers, monitors, and TVs, have become indispensable necessities in modern society. With the flourishing development of such portable electronic products, consumers have high expectations regarding their quality, functionality, and price. Some of these electronic products are provided with communications capabilities that depend on antenna structures to operate.

Although existing electronic devices have been adequate for their intended purposes, they have not been entirely satisfactory in all respects. For example, the arrangement of antenna structures and light-emitting units in the electronic devices is an issue. Therefore, up to the present, there are still some problems that need be improved in the technology behind electronic devices.

SUMMARY

In accordance with some embodiments of the present disclosure, an electronic device is provided. The electronic device includes a plurality of light-emitting units and an antenna disposed between the plurality of light-emitting units. The ratio of a width of the antenna to a distance between two adjacent ones of the plurality of light-emitting units is ranged from 0.1 to 0.8.

A detailed description is given in the following embodiments with reference to the accompanying drawings.

BRIEF DESCRIPTION OF THE DRAWINGS

The disclosure may be more fully understood by reading the subsequent detailed description and examples with references made to the accompanying drawings, wherein:

FIGS. 2A and 2B are top-view diagrams of the antenna in accordance with some embodiments of the present disclosure.

FIGS. 2C-2E are top-view diagrams of the light-emitting unit in accordance with some embodiments of the present disclosure.

DETAILED DESCRIPTION

Figure 1:
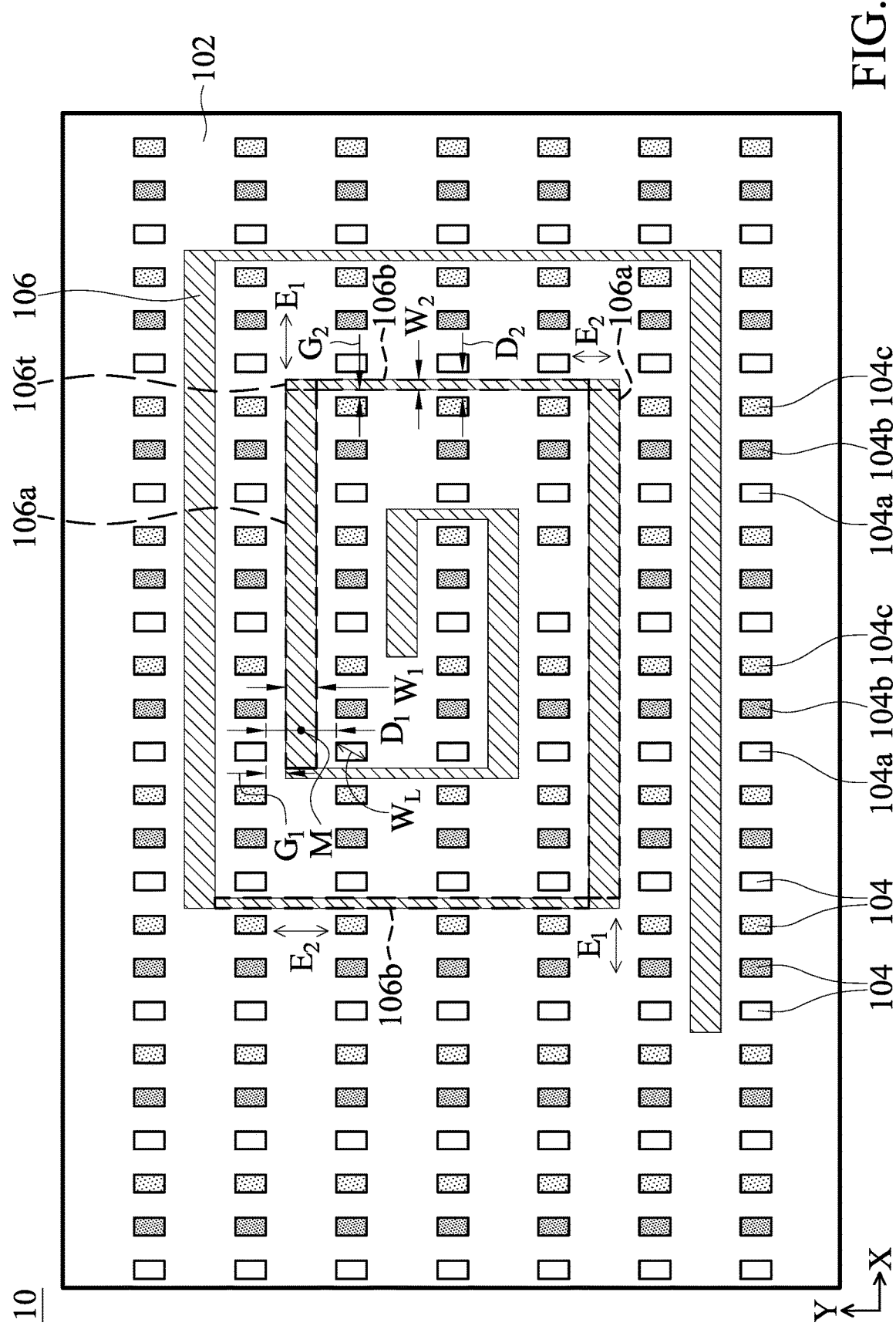
FIG. 1 is a top-view diagram of an electronic device in accordance with some embodiments of the present disclosure.

The electronic device of the present disclosure is described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the concept of the present disclosure may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. It should be noted that the elements or devices in the drawings of the present disclosure may be present in any form or configuration known to those with ordinary skill in the art. In addition, the expressions "a layer overlying another layer", "a layer is disposed above another layer", "a layer is disposed on another layer" and "a layer is disposed over another layer" may indicate that the layer is in direct contact with the other layer, or that the layer is not in direct contact with the other layer, there being one or more intermediate layers disposed between the layer and the other layer.

In addition, in this specification, relative expressions are used. For example, "lower", "bottom", "higher" or "top" are used to describe the position of one element relative to another. It should be appreciated that if a device is flipped upside down, an element that is "lower" will become an element that is "higher".

It should be understood that, although the terms first, second, third etc. may be used herein to describe various elements, components, regions, layers, portions and/or sections, these elements, components, regions, layers, portions and/or sections should not be limited by these terms. These terms are only used to distinguish one element, component, region, layer, portion or section from another element, component, region, layer or section. Thus, a first element, component, region, layer, portion or section discussed below could be termed a second element, component, region, layer, portion or section without departing from the teachings of the present disclosure.

It should be understood that this description of the exemplary embodiments is intended to be read in connection with the accompanying drawings, which are to be considered part of the entire written description. The drawings are not drawn to scale. In addition, structures and devices are shown schematically in order to simplify the drawing.

The terms "about" and "substantially" typically mean +/−10% of the stated value, more typically mean +/−5% of the stated value, more typically +/−3% of the stated value, more typically +/−2% of the stated value, more typically +/−1% of the stated value and even more typically +/−0.5% of the stated value. The stated value of the present disclosure is an approximate value. When there is no specific description, the stated value includes the meaning of "about" or "substantially".

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

In addition, in some embodiments of the present disclosure, terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In addition, the phrase "ranged from a first value to a second value" or "in a range between a first value and a second value" indicates that the range includes the first value, the second value, and other values between them.

In accordance with some embodiments of the present disclosure, an electronic device may include, but is not limited to, a display device (including a touch display device), a communication device, a sensing device, or a combination thereof. In accordance with some embodiments, the electronic device may be arranged in adjacency to form a tiled electronic device. Specifically, the display device may include, but is not limited to, an inorganic light-emitting diode (LED) display, an organic light-emitting diode (OLED) display, a liquid-crystal display (LCD), or a combination thereof. The inorganic light-emitting diode display may include a mini LED display or a micro LED display in accordance with some embodiments. In some examples, at least one of the light-emitting diodes may include a packaged light-emitting diode or a bare-die light-emitting diode.

FIG. 1 is a top-view diagram of an electronic device 10 in accordance with some embodiments of the present disclosure. It should be understood that some of the components of the electronic device 10 such as the driving element, the signal processor, and the circuit are omitted in FIG. 1 for clarity. In addition, it should be understood that additional features may be added to the electronic device in accordance with some embodiments of the present disclosure.

Referring to FIG. 1, the electronic device 10 may include a plurality of light-emitting units 104 disposed on a first substrate 102. In some embodiments, the light-emitting units 104 may include a light-emitting diode, other suitable light-emitting units, or a combination thereof. In addition, the electronic device 10 may include a plurality of pixels P and at least one of the pixels P may include several light-emitting units 104. In some embodiments, at least one of the pixels P may include three, four, or other suitable amounts of the light-emitting units. For example, as shown in FIG. 1, the pixel P may include three light-emitting units 104, which are denoted as light-emitting unit 104a, light-emitting unit 104b, and light-emitting unit 104c for clarity, in accordance with some embodiments. In addition, the light-emitting unit 104a, light-emitting unit 104b, and light-emitting unit 104c may serve as subpixels. In some embodiments, the light-emitting unit 104a, light-emitting unit 104b, and light-emitting unit 104c may emit red light, green light and blue light respectively, but it is not limited thereto. In some other embodiments, at least one of the pixels P may include, but is not limited to, four subpixels (light-emitting unit 104) for emitting red light, green light, blue light and yellow light, or for emitting red light, green light, blue light and white light.

In some embodiments, the material of the first substrate 102 may include, but is not limited to, glass, quartz, sapphire, polycarbonate (PC), polyimide (PI), polyethylene terephthalate (PET), rubbers, glass fibers, other polymer materials, any other suitable substrate material, or a combination thereof. In some embodiments, the first substrate 102 may include a metal-glass fiber composite substrate, a metal-ceramic composite substrate, a printed circuit board, or any other suitable substrate, but it is not limited thereto.

Figure 5:
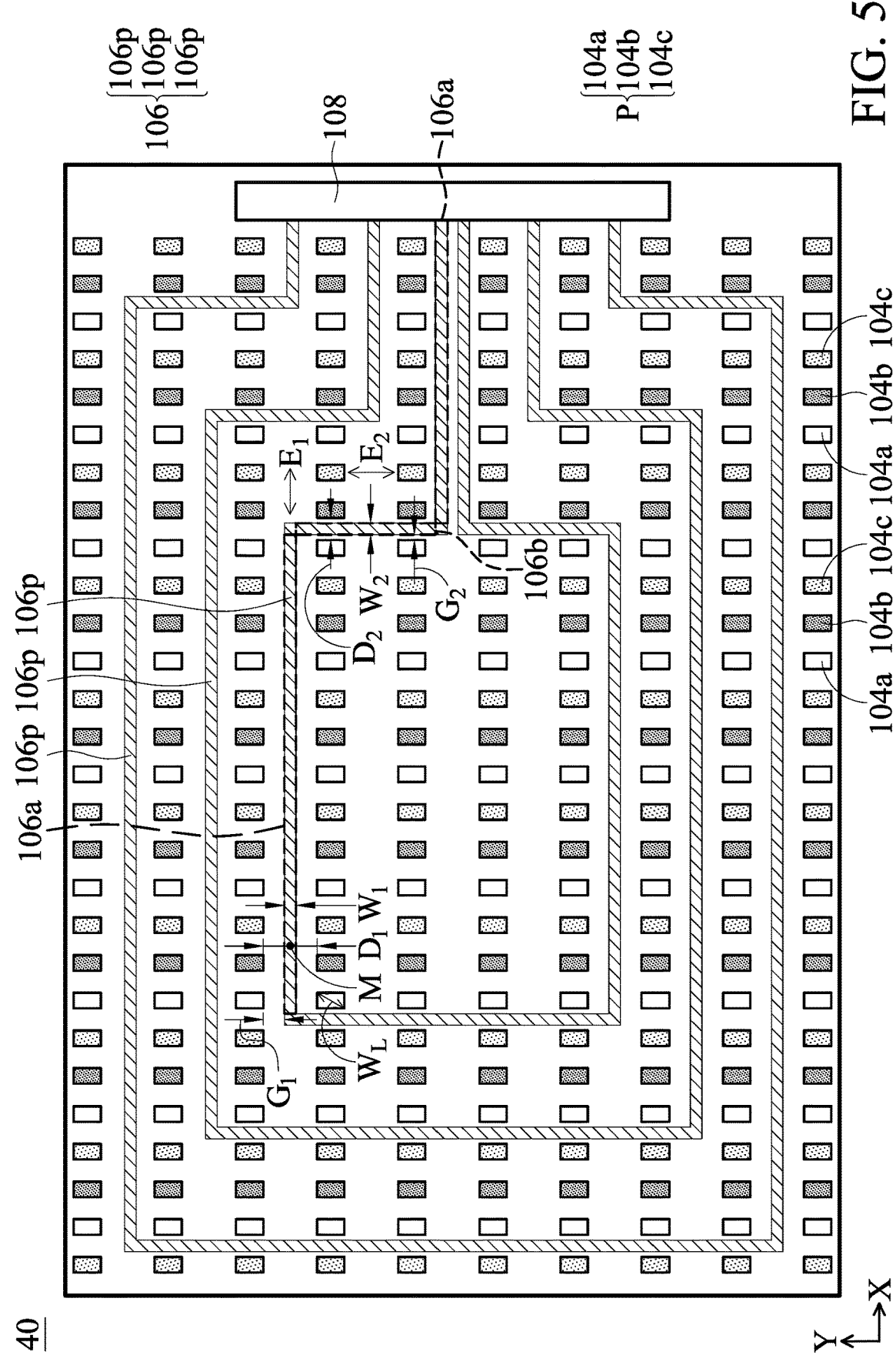
FIG. 5 is a top-view diagram of an electronic device in accordance with some embodiments of the present disclosure.

In addition, the electronic device 10 may include an antenna 106 disposed between the light-emitting units 104. The antenna 106 may receive and/or transmit the electromagnetic wave. The antenna 106 may be electrically connected to a controller 108 (e.g., as shown in FIG. 5) in accordance with some embodiments. More specifically, the antenna 106 may receive the electromagnetic wave from the environment and generate induced current to the controller in the electronic device 10. The controller may also control the current flowing to the antenna 106 to transmit the electromagnetic wave.

In some embodiments, the material of the antenna 106 may include conductive materials. In some embodiments, the conductive material may include, but is not limited to, copper, aluminum, molybdenum, tungsten, gold, chromium, nickel, platinum, titanium, silver, copper alloys, aluminum alloys, molybdenum alloys, tungsten alloys, gold alloys, chromium alloys, nickel alloys, platinum alloys, titanium alloys, silver alloys, any other suitable conductive materials (e.g., carbon nano-tubes), or a combination thereof. In some embodiments, the materials of the antenna 106 may include transparent conductive materials. For example, the transparent conductive material may include, but is not limited to, indium tin oxide (ITO), tin oxide (SnO), indium zinc oxide (IZO), indium gallium zinc oxide (IGZO), indium tin zinc oxide (ITZO), any other suitable transparent conductive materials, or a combination thereof. In some embodiments, the materials of the antenna 106 may include conductive polymers. For example, the conductive polymer may include, but is not limited to, poly (3,4-ethylenedioxythiophene), polystyrene sulfonate (PEDOT:PSS), polythiophenes (PT), polypyrrole (PPY), polyphenylene sulfide (PPS), or a combination thereof. In addition, the antenna 106 may be a single layered structure, or a multiple layered structure.

In some embodiments, at least a portion of the antenna 106 may have a first width $W_1$. In some embodiments, a distance between two adjacent light-emitting units 104 that are located at opposite sides of the antenna 106 may be a first distance $D_1$. In one example where the light-emitting units 104 are bare-die light-emitting diodes, the first distance $D_1$ is the distance between the bare dies (i.e. without package structures) of the two adjacent light-emitting units 104. In other examples where the light-emitting units 104 are packaged light-emitting diodes, the first distance $D_1$ is the distance between the packages of the light-emitting units 104. In some embodiments, the ratio of the first width $W_1$ to the first distance $D_1$ may be ranged from about 0.1 to about 0.8, or from about 0.2 to about 0.6, such as 0.3, 0.4, or 0.5. In particular, if the ratio of the first width $W_1$ to the first distance $D_1$ is too small (e.g., less than about 0.1), the performance of the antenna 106 may be poor due to high resistance. On the other hand, if the ratio of the first width $W_1$ to the first distance $D_1$ is too large (e.g., greater than about 0.8), the antenna 106 may reflect light and thus the visual effect of the electronic device 10 may be affected.

Specifically, the first width $W_1$ may be the maximum width of the antenna 106 on the plane that is substantially perpendicular to the normal direction of the first substrate 102, e.g., the X-Y plane, as shown in FIG. 1. It should be understood that the width of the antenna 106 described herein may refer to the width of the antenna 106 that is disposed between two adjacent light-emitting units 104 in a display region of the electronic device 10 (e.g., as shown in region B of FIG. 8). Moreover, the first distance $D_1$ may refer to the minimum distance between two adjacent light-emitting units 104 that are located at opposite sides of the antenna 106. For example, as shown in FIG. 1, the first distance $D_1$ may refer to the minimum distance between two light-emitting units 104a, two light-emitting units 104b, or two light-emitting units 104c that are located at opposite sides of the antenna 106.

More specifically, in the embodiments where the antenna 106 includes several line segment portions, the width of the antenna 106 may refer to the width that is substantially perpendicular to the extending direction of the line segment portion. For example, as shown in FIG. 1, the antenna 106 may include a first portion 106a that extends in an extending direction substantially the same as or different from the X-axis (e.g., the first direction $E_1$). The width of the first portion 106a of the antenna 106 may refer to the width that is substantially perpendicular to the extending direction.

On the other hand, in the embodiments where the antenna 106 includes curved portions, the width of the antenna 106 may refer to the width that is substantially perpendicular to a tangent T of the curved portion. For example, refer to FIGS. 2A and 2B, which are top-view diagrams of the antenna 106 in accordance with some embodiments of the present disclosure.

The antenna 106 may include one or more curved portions 106r. The width W of the curved portion 106r of the antenna 106 may refer to the width that is substantially perpendicular to the tangent T of the curved portion 106r.

In addition, referring to FIG. 1 again, the antenna 106 may include the first portion 106a extending along a first direction $E_1$ and a second portion 106b extending along a second direction $E_2$ different from the first direction $E_1$ in accordance with some embodiments. In other embodiments, the antenna 106 may include other portion(s) extending along other direction(s), but it is not limited thereto. The first width $W_1$ of the first portion 106a may be the same as or different from a second width $W_2$ of the second portion 106b. In some embodiments, the first width $W_1$ of the first portion 106a may be greater than the second width $W_2$ of the second portion 106b. In some embodiments, the first distance $D_1$ may refer to a subpixel distance between two adjacent subpixels (light-emitting units 104). As shown in FIG. 1, the first distance $D_1$ corresponding to the first portion 106a may be greater than a second distance $D_2$ corresponding to the second portion 106b. More specifically, the first distance $D_1$ between two adjacent subpixels that are located at opposite sides of the first portion 106a may be greater than the second distance $D_2$ between two adjacent subpixels that are located at opposite sides of the second portion 106b. The antenna 106 may include a turning portion 106t disposed between two portions (e.g., the first portion 106a and the second portion 106b), but it is not limited thereto. In some examples, the turning portion may connect the first portion 106a and the second portion 106b.

In some embodiments, a gap distance may refer to the minimum distance between the antenna 106 and the light-emitting units 104. In addition, the gap distance may be the distance between the antenna 106 and the bare die of the light-emitting unit, or the distance between the antenna 106 and the package of the light-emitting unit 104, depending on the type of the light-emitting unit 104, but it is not limited thereto. As shown in FIG. 1, in some embodiments, the first gap distance $G_1$ corresponding to the first portion 106a may be greater than a second gap distance $G_2$ that corresponds to the second portion 106b. Moreover, in some embodiments, the ratio of a first gap distance $G_1$ to the first distance $D_1$ may be ranged from about 0.05 to about 0.75, or from about 0.25 to about 0.75, such as 0.3, 0.35, 0.4, 0.45, 0.5, 055, 0.6, 0.65, or 0.7.

It should be noted that if the ratio of the first gap distance $G_1$ to the first distance $D_1$ is too small (e.g., less than about 0.05) or too large (e.g., greater than about 0.75), the antenna 106 may be too close to some of the light-emitting units 104 and may affect the performance of the electronic device 10. In some embodiments, the antenna 106 may overlap a midpoint M of the first distance D1 between two adjacent light-emitting units 104, and thus the antenna 106 may not be too close to or too far from the light-emitting units 104. The term "overlap" may refer to partially overlap or entirely overlap in the normal direction of the first substrate 102 in the present disclosure.

Moreover, in some embodiments, the ratio of the first width $W_1$ of the antenna 106 to a width $W_L$ of one of the light-emitting units 104 may be ranged from about 0.4 to about 100, or from about 0.6 to about 75, such as 0.6, 5, 20, or 50. In particular, if the ratio of the first width $W_1$ to the width $W_L$ is too small (e.g., less than about 0.4), the performance of the antenna 106 may be poor due to high resistance. On the other hand, if the ratio of the first width $W_1$ to the width $W_L$ is too large (e.g., greater than about 100), the antenna 106 may reflect light and the display quality of the electronic device 10 may be affected.

In one example where the light-emitting unit 104 is a bare-die light-emitting diode, the width $W_L$ of the light-emitting unit 104 may refer to the maximum width of the bare die. In other examples where the light-emitting unit 104 is a packaged light-emitting diode, the width $W_L$ of the light-emitting unit 104 may refer to the maximum width of the package. In addition, the maximum width may be the farthest distance between two points on the boundary or profile of the bare die of the light-emitting unit 104. In embodiments where the profile of the light-emitting unit 104 has obvious corners, the width $W_L$ of the light-emitting unit 104 may refer to the maximum distance between two corners. For example, refer to FIGS. 2C and 2D, which are top-view diagrams of the light-emitting unit 104 in accordance with some embodiments of the present disclosure. The width $W_L$ of the light-emitting unit 104 may refer to the maximum distance between two corners C of the profile of the light-emitting unit 104. On the other hand, in embodiments where the profile of the light-emitting unit 104 does not have obvious corners, the width $W_L$ of the light-emitting unit 104 may be obtained by actual measurement of the maximum distance between two points of the profile, as shown in FIG. 2E.

Referring to FIG. 1, in some embodiments, the antenna 106 may further include several first portions 106a extending along the first direction $E_1$ and several second portions 106b extending along the second direction $E_2$. In some embodiments, the first portions 106a and the second portions 106b may be connected to form a continuous structure. In some embodiments, the antenna 106 may include several spiral or loop structures. As shown in FIG. 1, the antenna 106 may have a helical shape or a spiral shape in accordance with some embodiments. In addition, the helical or spiral shape may be left-handed or right-handed.

Figure 3:
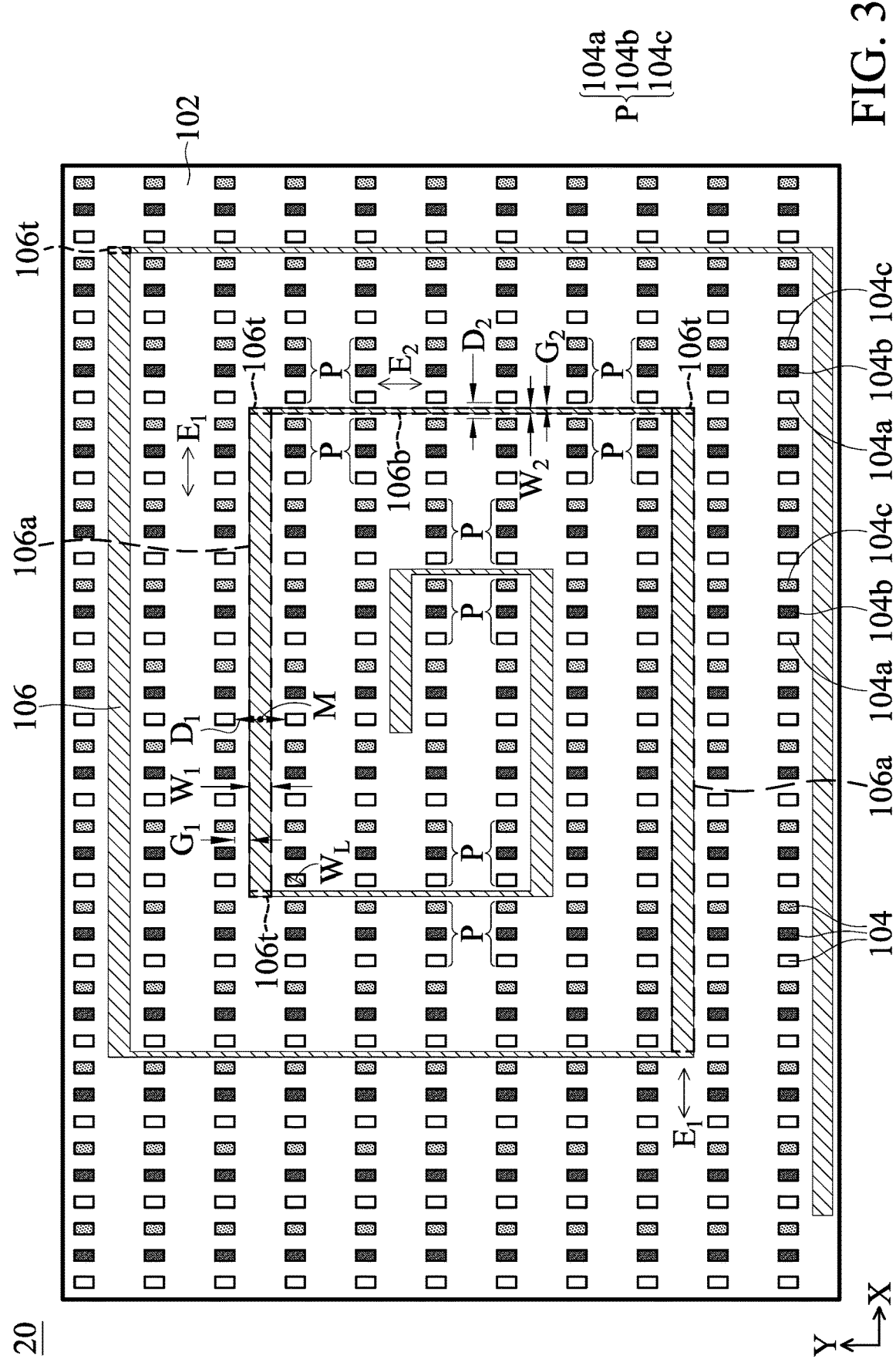
FIG. 3 is a top-view diagram of an electronic device in accordance with some embodiments of the present disclosure.

Next, refer to FIG. 3, which is a top-view diagram of an electronic device 20 in accordance with some other embodiments of the present disclosure. In should be understood that the same or similar components or elements in the context of the descriptions provided above and below are represented by the same or similar reference numerals. The materials, manufacturing methods and functions of these components or elements are the same as or similar to those described above, and thus will not be repeated herein. As shown in FIG. 3, the antenna 106 may be disposed between two adjacent pixels P in accordance with some embodiments. Moreover, the antenna 106 may not be disposed between two adjacent subpixels (e.g., between the light-emitting units 104a and 104b, or between the light-emitting units 104b and 104c) in accordance with some embodiments. In other words, the pixel P may not be interrupted by layout of the antenna 106 in accordance with some embodiments. In particular, since one pixel P may serve as a unit for display, the antenna 106 disposed between the pixels P rather than between the subpixels may have better display quality.

In some embodiments, the antenna 106 may include turning portions 106t. The turning portion 106t may be located at the position where the extending direction of the antenna 106 is changed. For example, as shown in FIG. 3, the turning portion 106t may be located at the position where the first portion 106a is connected to the second portion 106b, i.e. the position where the extending direction of the antenna 106 is changed from the first direction $E_1$ to the second direction $E_2$. In some embodiments, the turning portion 106t may also be disposed between the pixels P, rather than between the subpixels (e.g., between the light-emitting units 104a and 104b, or between the light-emitting units 104b and 104c). In addition, in some embodiments, one pixel P may include N subpixels (light-emitting units 104), i.e. the number of subpixels is N. In some embodiments, the first portion 106a may pass through or pass by N×n subpixels (i.e. the amount of subpixels is N times n), wherein n refers to any positive integer. For example, as shown in FIG. 3, the pixel P may include three subpixels, and the first portion 106a may pass through or pass by 3n subpixels, e.g., 3, 6, 9, 12, 15 subpixels in accordance with some embodiments.

Figure 4:
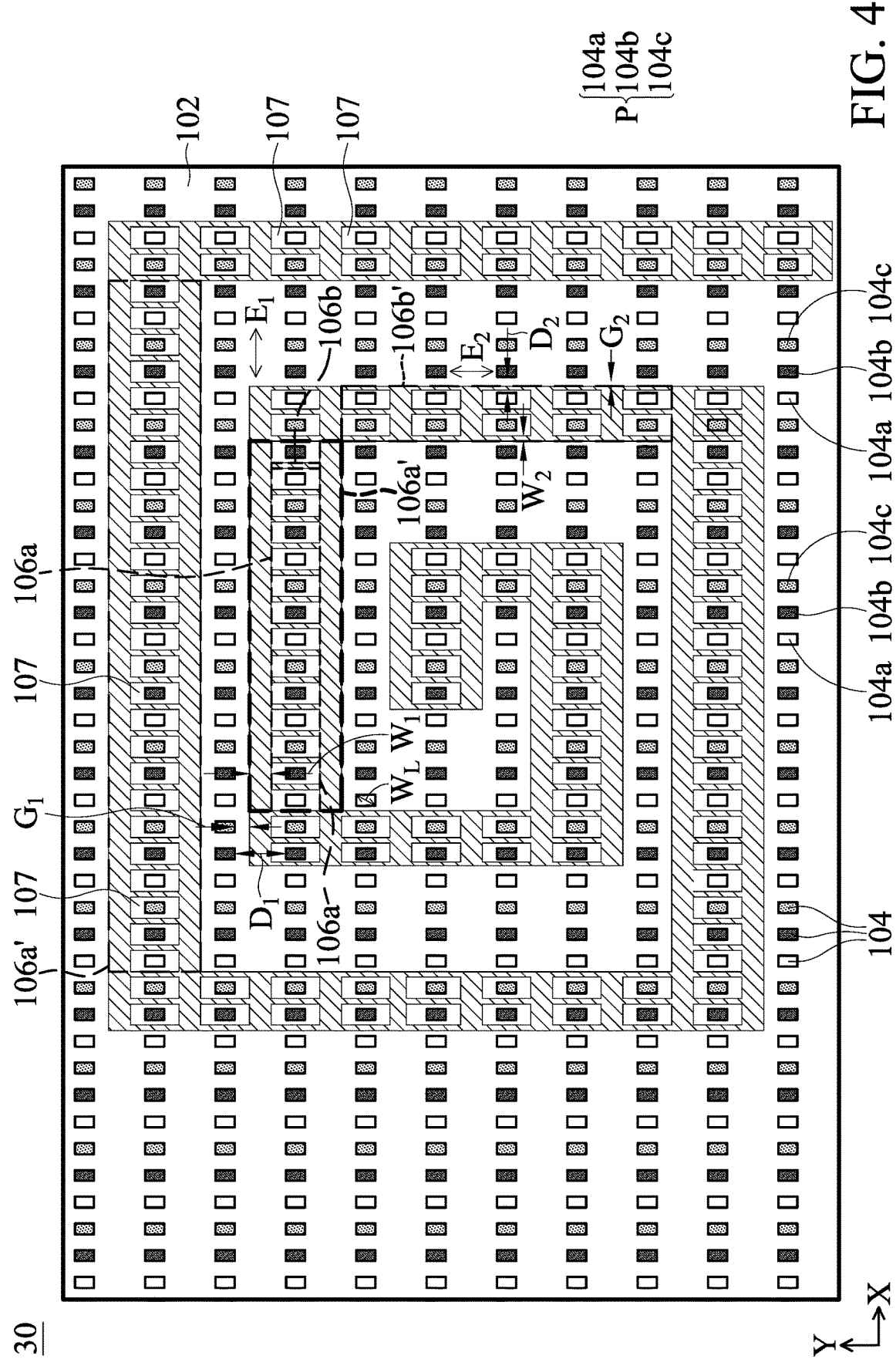
FIG. 4 is a top-view diagram of an electronic device in accordance with some embodiments of the present disclosure.

Next, refer to FIG. 4, which is a top-view diagram of an electronic device 30 in accordance with some other embodiments of the present disclosure. As shown in FIG. 4, in some embodiments, the electronic device 30 may include a plurality of first portions 106a and a plurality of second portions 106b that are connected to enclose some of the light-emitting units 104. More specifically, several first portions 106a and several second portions 106b may be connected together to form a combined first portion 106a' and a combined second portion 106b'. In some embodiments, the combined first portion 106a' may extend in the first direction $E_1$, and the combined second portion 106b' may extend in the second direction $E_2$. In some embodiments, some of the second portions 106b may be disposed between subpixels. In some embodiments, the antenna 106 that includes part of the combined first portion 106a' or part of the combined second portion 106b' may be disposed between subpixels. The combined first portion 106a' and the combined second portion 106b' may increase the area of the antenna 106 in the electronic device 30, and the resistance of the antenna 106 may be reduced.

In some embodiments, the combined first portion 106a' and the combined second portion 106b' may include openings 107 disposed therein. The light-emitting units 104 may be disposed in the openings 107. In some embodiments, the opening 107 may be surrounded by the first portions 106a and the second portions 106b. Although one opening 107 may encompass one light-emitting unit 104 in the embodiment shown in FIG. 4, one opening 107 may encompass more than one light-emitting units 104 in accordance with some other embodiments. In other words, the numbers of the first portions 106a and the second portions 106b in the combined first portion 106a' or the combined second portion 106b' may be adjusted depending on need in various embodiments.

In some embodiments, the combined first portion 106a' and the combined second portion 106b' may be formed by using one or more deposition processes, photolithography processes and etching process. In some embodiments, the deposition process may include a chemical vapor deposition process, a physical vapor deposition process, an electroplating process, an electroless plating process, another suitable process, or a combination thereof. For example, the chemical vapor deposition process may include a low-pressure chemical vapor deposition (LPCVD) process, a low-temperature chemical vapor deposition (LTCVD) process, a rapid thermal chemical vapor deposition (RTCVD) process, a plasma enhanced chemical vapor deposition (PECVD) process, an atomic layer deposition (ALD) process, and so on. For example, the physical vapor deposition process may include a sputtering process, an evaporation process, pulsed laser deposition, and so on. In addition, in some embodiments, the photolithography process may include photoresist coating (e.g., spin coating), soft baking, hard baking, mask aligning, exposure, post-exposure baking, developing the photoresist, rinsing, drying, and other suitable processes. In some embodiments, the etching process may include a dry etching process, a wet etching process, or another suitable etching process.

Next, refer to FIG. 5, which is a top-view diagram of an electronic device 40 in accordance with some other embodiments of the present disclosure. As shown in FIG. 5, the antenna 106 may have a loop shape. The antenna 106 may include several independent loop structures 106p in accordance with some embodiments. The number of the loop structures 106p may be any positive integer. In some embodiments, the loop structures 106p may be coaxial. The loop structure 106p may also include the first portions 106a extending along the first direction $E_1$ and the second portions 106b extending along the second direction $E_2$.

In addition, as described above, the antenna 106 may be electrically connected to a controller 108 to receive and/or transmit the electromagnetic wave. In some embodiments, the controller 108 may include a driving element, a signal processor or a combination thereof. For example, the antenna 106 may receive the electromagnetic wave from the environment and generate induced current to the signal processer. The signal processor may then transmit signals to the driving element to control the current flow of the antenna 106. In some embodiments, the driving element may include an active driving element, a passive driving element and/or a combination thereof. For example, the active driving element may include a thin-film transistor (TFT). In some embodiments, the active driving element may be integrated with the circuit of a gate on array (GOP) structure. The passive driving element may be controlled by an IC or a microchip disposed in or outside the electronic device 10. In some embodiments, the IC may control the antenna 106 and signals lines (e.g., data lines and scan lines) at the same time.

It should be understood that although the loop structure 106p has a square shape in the embodiments shown in FIG. 5, the loop structure may have another suitable shape, such as a circular shape, a diamond shape, and so on depending on need, in accordance with some other embodiments.

Figure 6:
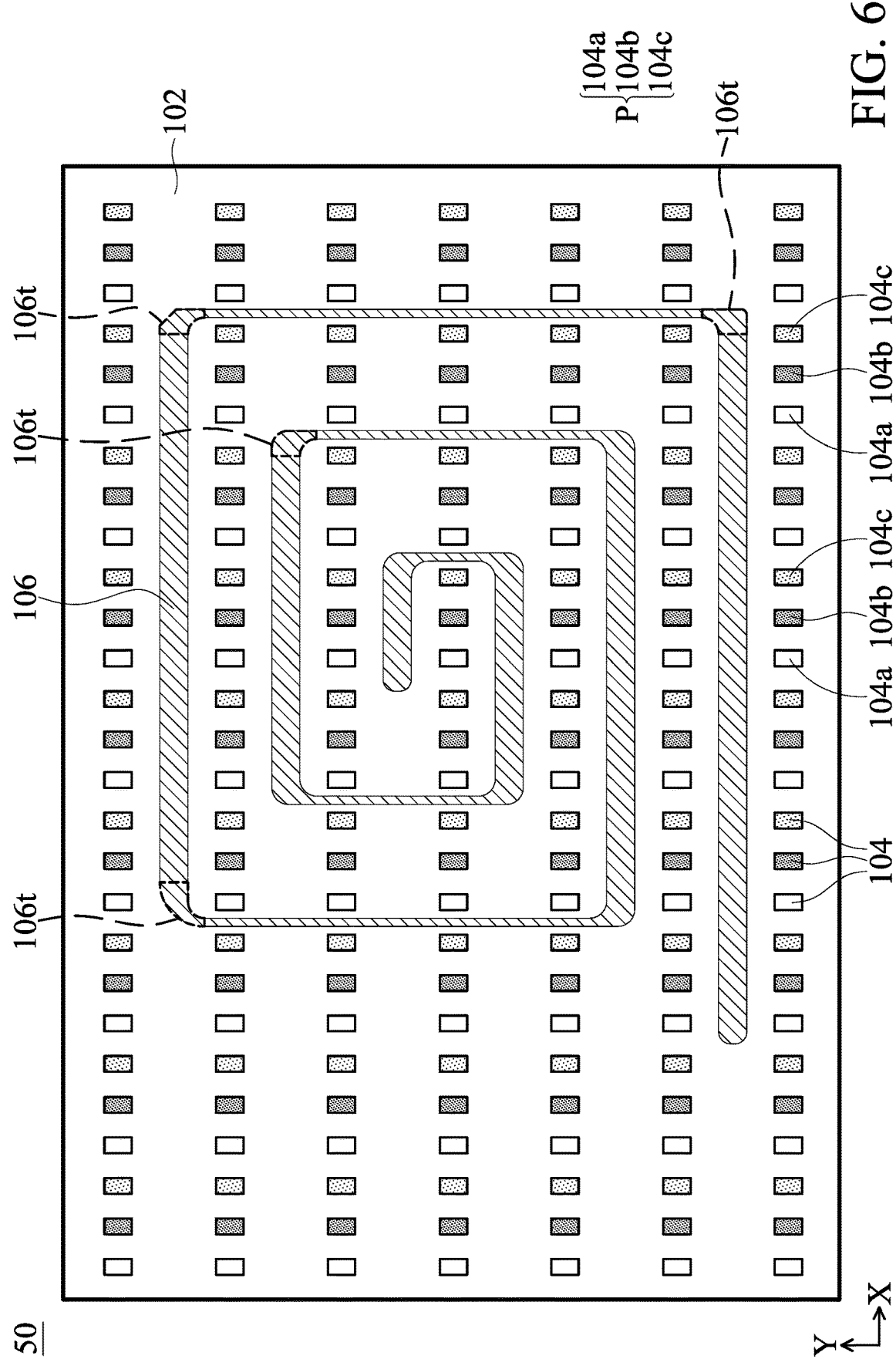
FIG. 6 is a top-view diagram of an electronic device in accordance with some embodiments of the present disclosure.

Next, refer to FIG. 6, which is a top-view diagram of an electronic device 50 in accordance with some other embodiments of the present disclosure. As shown in FIG. 6, the turning portions 106t of the antenna 106 may be processed in accordance with some embodiments. In some embodiments, the turning portions 106t may include a rounded corner, an angled corner, or a combination thereof in accordance with some embodiments. In one example, the rounded corners may have different radius of curvature. In particular, the rounded corner, or angled corner located at the turning portions 106t may reduce the risk of occurrence of corona discharge, and the performance of the antenna 106 may be improved.

In some embodiments, the rounded corner, or the angled corner of the antenna 106 may be formed by using a photolithography process, an etching process, a grinding process, a polishing process, or a combination thereof.

Figure 7:
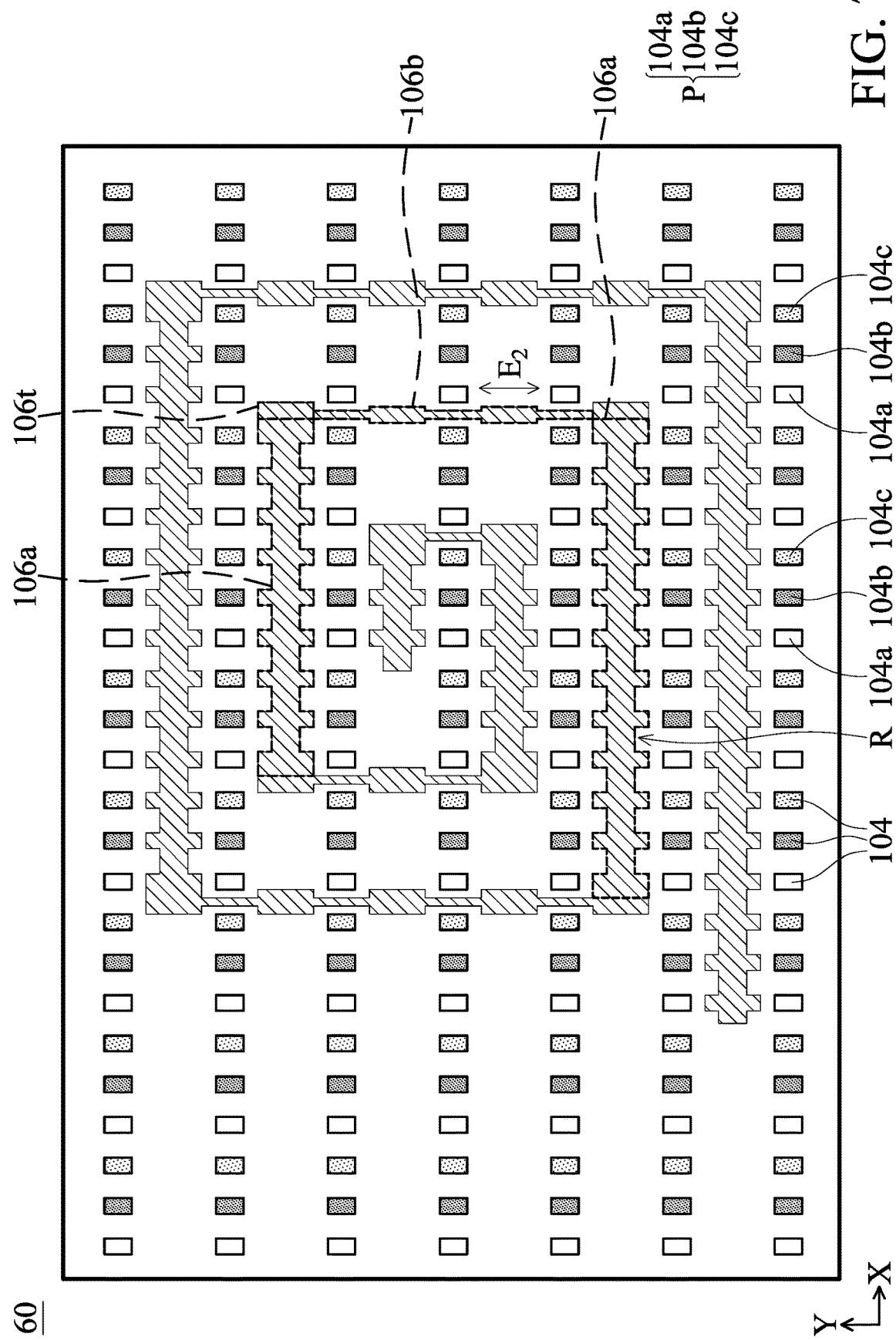
FIG. 7 is a top-view diagram of an electronic device in accordance with some embodiments of the present disclosure.

Next, refer to FIG. 7, which is a top-view diagram of an electronic device 60 in accordance with some other embodiments of the present disclosure. As shown in FIG. 7, the first portion 106a and the second portion 106b of the antenna 106 may include recessed portions R. In other words, the width of the first portion 106a may be inconsistent. The width of the second portion 106b may be inconsistent. Specifically, in some embodiments, the electronic device 60 may include a circuit layer (as shown in FIGS. 10A-10D) disposed on the first substrate 102 or other metal lines disposed on another layers, the recessed portions R may correspond to the positions of theses circuit layer or metal lines. The recessed portions R may reduce the overlapping area between the circuit layer (or other metal lines) and the antenna 106. With such a configuration, the issues of signal interference, capacitive coupling and so on may be reduced in the electronic device 60. In some embodiments, the metal lines may include signal lines for controlling the light-emitting units 104.

In some embodiments, the recessed portion R of the antenna 106 may be formed by using photolithography processes, etching process, or a combination thereof.

Moreover, in some embodiment, the interval arrangement of the light-emitting units 104 may be different in the different directions. For example, as shown in FIG. 7, the interval between the light-emitting units 104 in the Y direction is greater than the interval between the light-emitting units 104 in the X direction. In such a configuration, the antenna 106 may be designed to have greater dimensions in the Y direction.

Figure 8:
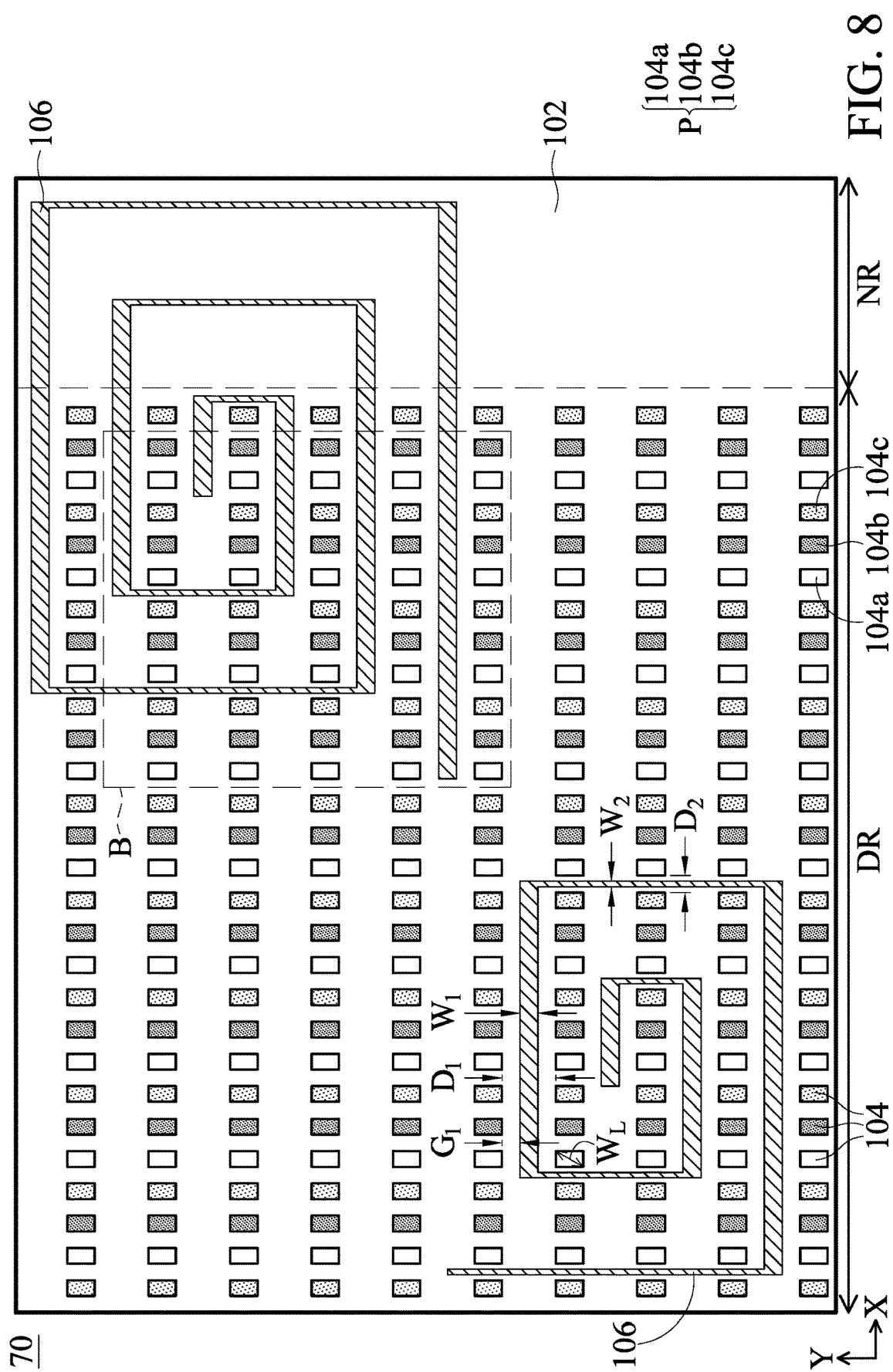
FIG. 8 is a top-view diagram of an electronic device in accordance with some embodiments of the present disclosure.

Next, refer to FIG. 8, which is a top-view diagram of an electronic device 70 in accordance with some other embodiments of the present disclosure. As shown in FIG. 8, the electronic device 70 may include a plurality of antennas 106. In some embodiments, the antennas 106 may have different layouts. For examples, the antennas 106 may have different shapes, different rotation directions (i.e. left-handed and right-handed) and/or different numbers of turns. Specifically, the antennas 106 having different numbers of turns may be used to modulate the microwave of different frequencies or energy.

In addition, in some embodiments where the electronic device 10 may be a display, the antenna 106 may be disposed in the display region DR. In some embodiments, a portion of the antenna 106 may be disposed in the display region DR while another portion of the antenna 106 may be disposed in the non-display region NR.

Figure 9:
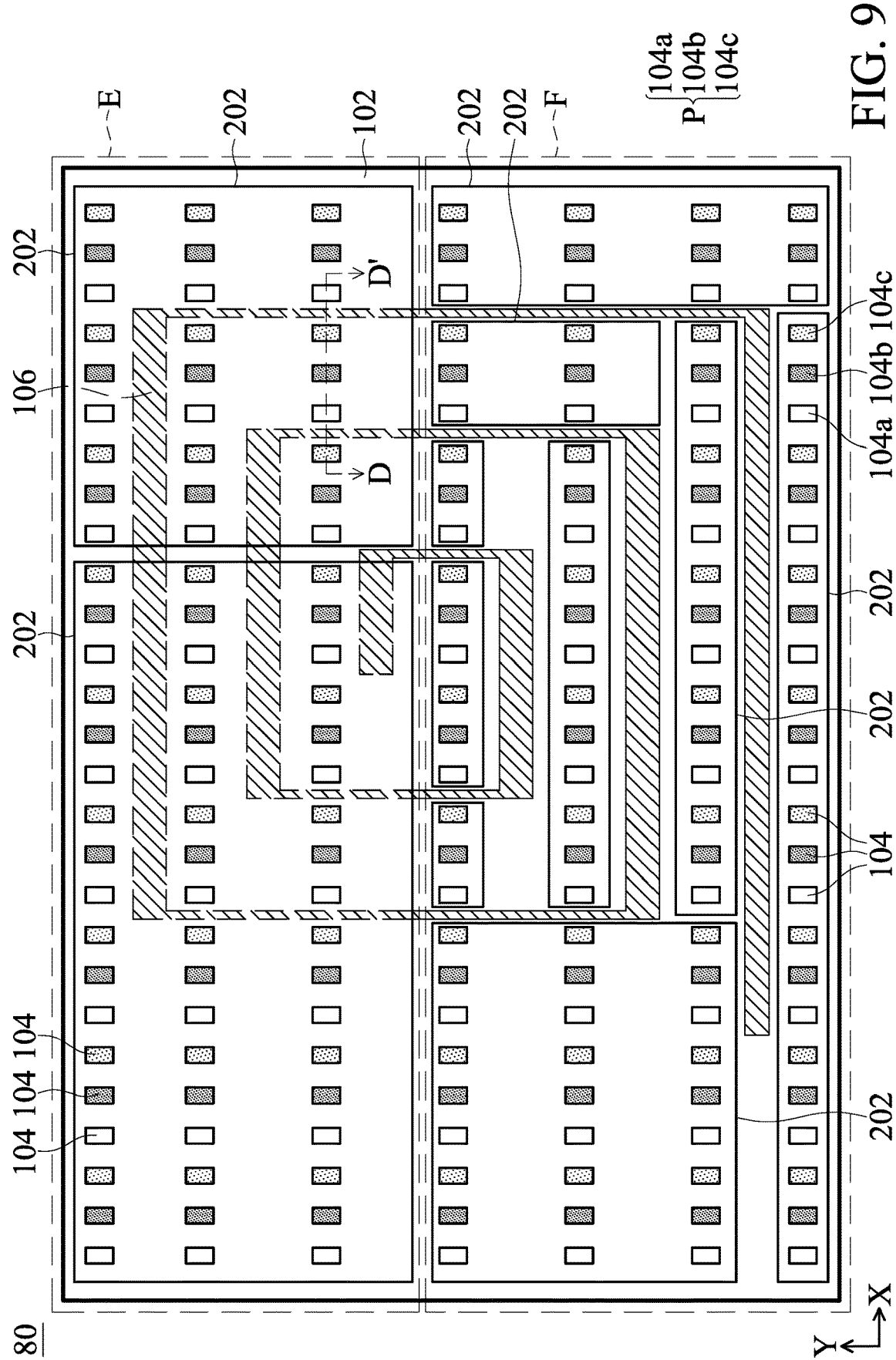
FIG. 9 is a top-view diagram of an electronic device in accordance with some embodiments of the present disclosure.

Next, refer to FIG. 9, which is a top-view diagram of an electronic device 80 in accordance with some other embodiments of the present disclosure. As shown in FIG. 9, the electronic device 80 may further include a plurality of second substrates 202 disposed on the first substrate 102. In some embodiments, the second substrate 202 may serve as an intermediate substrate. Specifically, the light-emitting units 104 may be disposed on the second substrate 202 first, and then the second substrate 202 along with the light-emitting units 104 may be together transferred to the first substrate 102. It should be understood that the number of the light-emitting units 104 and/or the number of the second substrate 202 may be adjusted depending on need in various embodiments. The shape of the second substrate 202 illustrated in FIG. 9 are only exemplary, the shape of the second substrate 202 may include a circular shape, a rectangular shape, other suitable shapes, or a combination thereof. The electronic device 80 may include second substrates with different shapes.

In this embodiment, the antenna 106 may be disposed on the first substrate 102. In some embodiments, the second substrate 202 may partially or entirely overlap the antenna 106, for example, as shown in region E. In some embodiments, the antenna 106 may be disposed between the second substrates 202, for example, as shown in region F. In some embodiments, a portion of the antenna 106 may overlap the second substrate 202 and a portion of the antenna 106 may be disposed between the second substrates 202.

In some embodiments, the material of the second substrate 202 may include, but is not limited to, silicon, carbon silicide (SiC), magnesium oxide (MgO), MgAlxOy, gallium nitride (GaN), glass, sapphire, polycarbonate (PC), polyimide (PI), polyethylene terephthalate (PET), rubbers, glass fibers, any other suitable substrate material, or a combination thereof. In some embodiments, the first substrate 102 may include a printed circuit board, but it is not limited thereto.

Figure 10A:
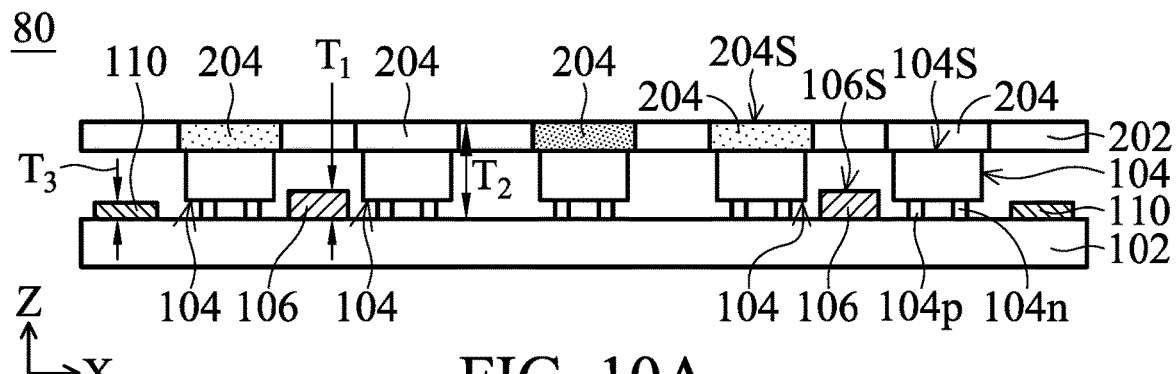
FIGS. 10A-10D are cross-sectional diagrams of the electronic device along line segment D-D' in FIG. 9 in accordance with some embodiments of the present disclosure.

Next, refer to FIGS. 10A-10D, which are cross-sectional diagrams of the electronic device 80 along line segment D-D' in FIG. 9 in accordance with some embodiments of the present disclosure. Referring to FIG. 10A, the light-emitting units 104, the antenna 106 may be disposed on the first substrate 102. The light-emitting units 104 may be disposed between the first substrate 102 and the second substrate 202. The antenna 106 and the light-emitting units 104 may not overlap in the normal direction of the first substrate 102 (e.g., the Z direction in the figure).

In addition, the electronic device 80 may further include a circuit layer 110 disposed on the first substrate 102 in accordance with some embodiments. The first substrate 102 may serve as an array substrate. The circuit layer 110 may be electrically connected to the controller (e.g., as shown in FIG. 5) in accordance with some embodiments. Moreover, the light-emitting unit 104 may include a first electrode 104p and a second electrode 104n that are electrically connected to the circuit layer 110 through metal lines (not illustrated), conductive pads (not illustrated) and/or other suitable traces.

In some embodiments, the material of the circuit layer 110 may include conductive material(s). In some embodiments, the conductive material may include, but is not limited to, copper, aluminum, molybdenum, tungsten, gold, chromium, nickel, platinum, titanium, silver, copper alloys, aluminum alloys, molybdenum alloys, tungsten alloys, gold alloys, chromium alloys, nickel alloys, platinum alloys, titanium alloys, silver alloys, any other suitable conductive materials (e.g., carbon nano-tubes), or a combination thereof.

As shown in FIG. 10A, the electronic device 80 may further include a wavelength conversion layer 204 disposed on the light-emitting unit 104 in accordance with some embodiments. In some embodiments, the wavelength conversion layer 204 may disposed within or on the second substrate 202. In other embodiments, the wavelength conversion layer 204 may be disposed between the light-emitting unit 104 and the second substrate 202, and/or the second substrate 202 may be disposed between the wavelength conversion layer 204 and the light-emitting unit 104, but it is not limited thereto. In some embodiments, the light-emitting unit 104 may emit white light, blue light, green light, red light, or UV light. The wavelength conversion layer 204 may convert the light emitted from the light-emitting unit 104 into the colors that are needed. For example, the wavelength conversion layer 204 may convert the light emitted from the light-emitting unit 104 into red light, green light or blue light in accordance with embodiments. In some examples, the wavelength conversion layer 204 may convert a part of the light from the light-emitting unit 104, while the other part of the light may not be converted, but is it not limited thereto. In addition, in some embodiments, a top surface 106S of the antenna 106 may be lower than a top surface 104S of the light-emitting unit 104. In some embodiments, the top surface 106S of the antenna 106 may be lower than a top surface 204S of the wavelength conversion layer 204. In addition, in some embodiments, a thickness $T_1$ of the antenna 106 may be less than a thickness $T_2$ of the light-emitting unit 104. In other embodiments, the thickness $T_1$ of the antenna 106 may be less than a sum of a thickness $T_2$ of the light-emitting unit 104 and a thickness of the wavelength conversion layer 204. In such a configuration, the antenna 106 may interfere less with the emitting of light-emitting unit 104. In some embodiments, a thickness $T_3$ of the circuit layer 110 may be less than the thickness $T_1$ of the antenna 106. In accordance with some embodiments, the thickness $T_1$, $T_2$ and $T_3$ may refer to the largest thickness in the normal direction of the first substrate 102 or the second substrate 202.

In some embodiments, the material of the wavelength conversion layer 204 may include, but is not limited to, quantum dot (QD) materials, fluorescence materials, phosphor materials, or a combination thereof.

It should be understood that although the detailed structure of the light-emitting unit 104 is not illustrated in the figures, the light-emitting unit 104 may have any suitable structure depending on need. For example, in embodiments where the light-emitting unit 104 may be LED, the light-emitting unit 104 may include a first semiconductor layer having a p-type conductivity type, a second semiconductor layer having an n-type conductivity type, a quantum well layer disposed between the first semiconductor layer and the second semiconductor layer, and the p-electrode (e.g., the first electrode 104p) and an n-electrode (e.g., the second electrode 104n) respectively electrically connected to the first semiconductor layer and the second semiconductor layer. Moreover, the material of first semiconductor layer may include p-type gallium nitride (p-GaN), and the material of the second semiconductor layer may include n-type gallium nitride (n-GaN). The quantum well layer may include a single quantum well (SQW) or a multiple quantum well (MQW), and the material of the quantum well layer may include, but is not limited to, indium gallium nitride, gallium nitride or a combination thereof.

Figure 10B:
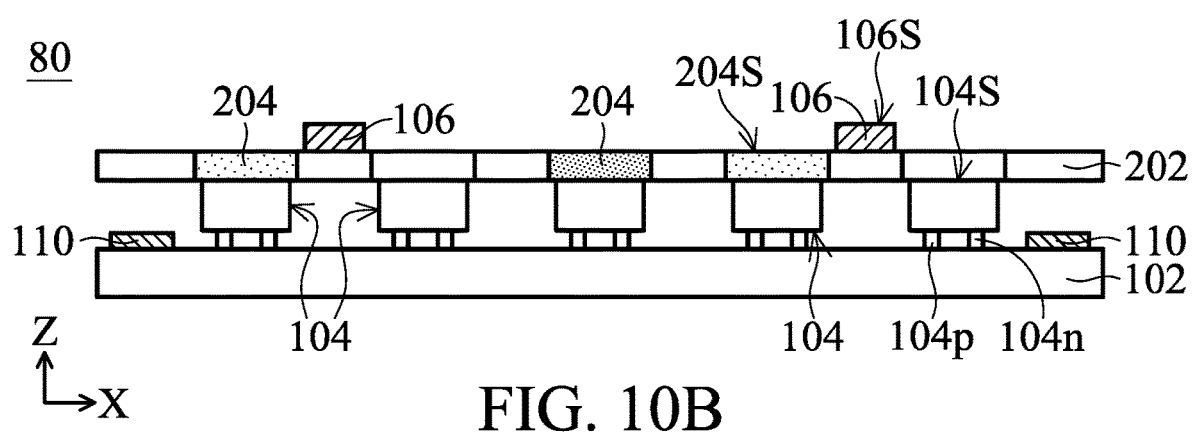

Next, referring to FIG. 10B, the embodiments shown in FIG. 10B is similar to the embodiments shown in FIG. 10A. The difference between them is that the antenna 106 may be disposed on the second substrate 202 in the embodiments shown in FIG. 10B. Similarly, in this embodiment, the antenna 106 and the light-emitting units 104 may not overlap in the normal direction of the first substrate 102.

Figure 10C:
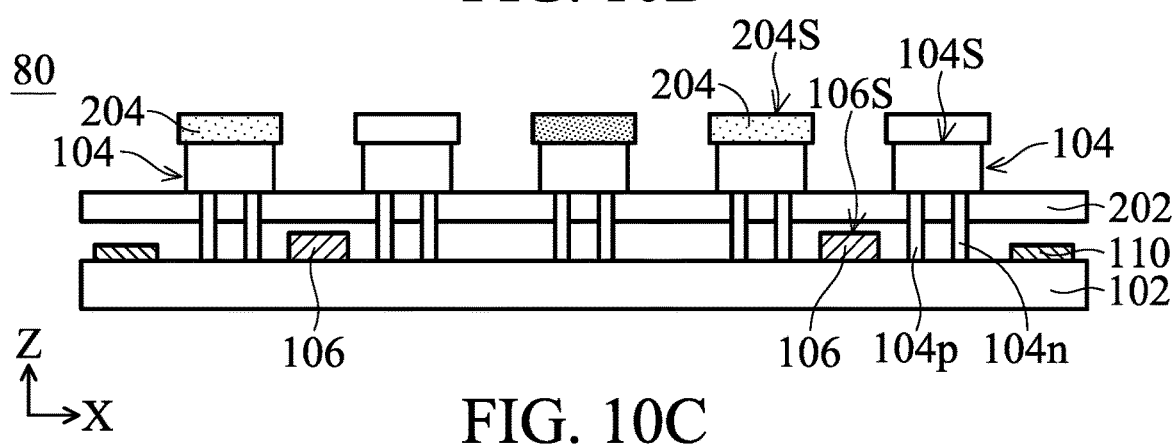
Figure 10D:
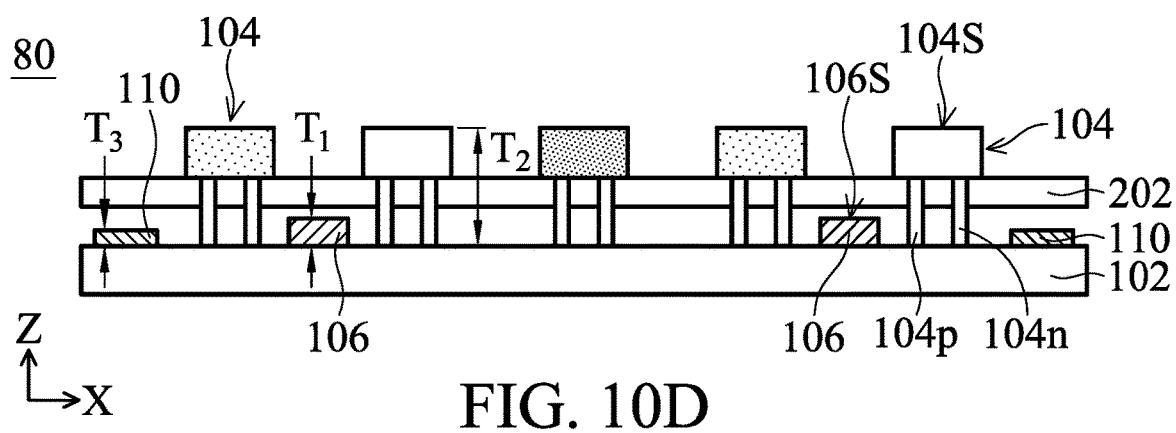

Next, referring to FIG. 10C, the embodiments shown in FIG. 10C is similar to the embodiments shown in FIG. 10A. The difference between them is that the light-emitting unit 104 may be disposed on the second substrate 202 in the embodiments shown in FIG. 10C. In addition, the first electrode 104p and the second electrode 104n of the light-emitting units 104 may penetrate through the second substrate 202 and be electrically connected to the circuit layer 110. Next, referring to FIG. 10D, the embodiments shown in FIG. 10D is similar to the embodiments shown in FIG. 10C. The difference between them is electronic device 80 may not include the wavelength conversion layer 204 in the embodiments shown in FIG. 10D. In this embodiment, the light-emitting units 104 may emit red light, green light and/or blue light. It is noted that in FIGS. 10A-10D, the second substrate 202 may be disposed on the light-emitting units 104 or disposed adjacent to the light-emitting unit 104s in accordance with some embodiments of the present disclosure. In some examples, at least one intermediate layer may be disposed between the second substrate 202 and the light-emitting units 104, but it is not limited thereto.

Figure 11:
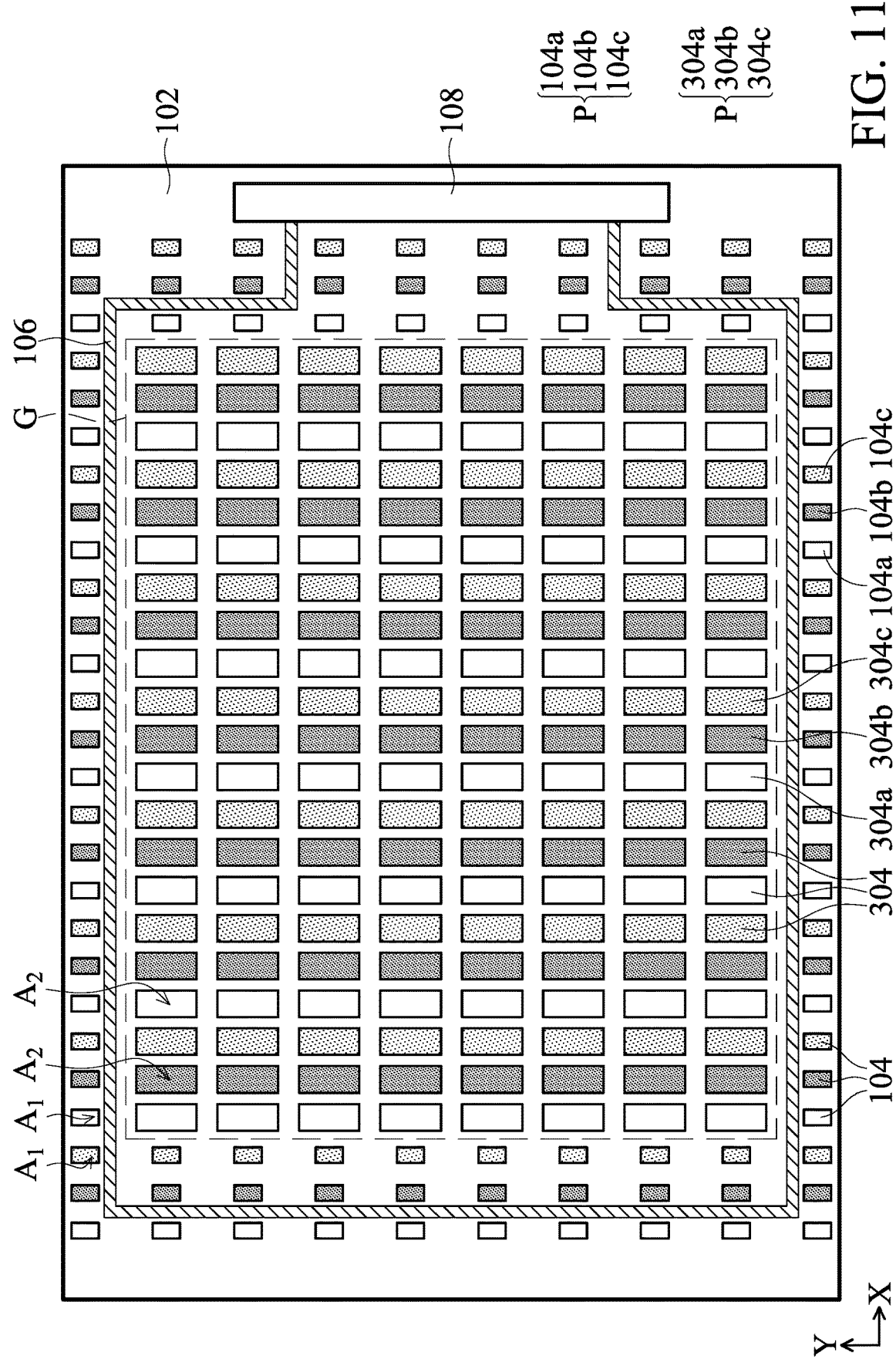
FIG. 11 is a top-view diagram of an electronic device in accordance with some embodiments of the present disclosure.

Next, refer to FIG. 11, which is a top-view diagram of an electronic device 90 in accordance with some other embodiments of the present disclosure. As shown in FIG. 11, the electronic device 90 may include different types of light-emitting units, i.e. hybrid-type light-emitting units. Specifically, in some embodiments, the electronic device 90 may include the light-emitting units 104 and light-emitting units 304. In some embodiments, the light-emitting units 104 may include LED, quantum dot LED (QDLED), mini LED, micro LED, or a combination thereof. In some embodiments, the light-emitting units 304 may include OLED, QLED or a combination thereof. In other embodiments, the light-emitting units 304 may serve as a backlight module or sub-pixels of a liquid-crystal display (as shown in region G). In addition, in embodiments where the light-emitting units 304 serve as the backlight module of a liquid-crystal display, the electronic device 90 may further include a display panel disposed on the backlight module. As shown in FIG. 11, the light-emitting units 304 (e.g., the light-emitting unit 304a, light-emitting unit 304b, and light-emitting unit 304c) may also serve as subpixels for emitting red light, green light and blue light respectively in accordance with some embodiments.

In some embodiments, the light-emitting unit 104 may have a first subpixel area $A_1$ and the light-emitting unit 304 may have a second subpixel area $A_2$ that is greater than the first subpixel area $A_1$. Since the light intensity of OLED or LCD may be less than that of LED, the area or dimension of subpixels of OLED or LCD may be greater so as to achieve similar light intensity as LED. In some embodiments, since the light-emitting units 304 may have greater subpixel areas, there may be less space between the light-emitting units 304 to dispose the antenna 106. Therefore, the antenna 106 may be disposed between the light-emitting units 104 and the light-emitting units 304 in accordance with some embodiments. In other words, the antenna 106 may be disposed between the light-emitting units having different subpixel areas. Moreover, in some embodiments, the antenna 106 may be disposed near the boundary (e.g., indicated as region G) between the light-emitting units 104 and the light-emitting units 304.

To summarize the above, in accordance with some embodiments of the present disclosure, the width of the antenna and the distance between subpixels may be controlled in specific ranges so that the dimension of the antenna may be increased and the resistance of the antenna may be reduced. In addition, the antenna may not reflect excess light and therefore the visual effect of the light-emitting units may be unaffected. In accordance with some embodiments of the present disclosure, the arrangement of the layout of the antenna may be designed so that the reflected light generated by the antenna may be reduced and the display quality of the electronic device may be improved.

Although some embodiments of the present disclosure and their advantages have been described in detail, it should be understood that various changes, substitutions and alterations can be made herein without departing from the spirit and scope of the disclosure as defined by the appended claims. For example, it will be readily understood by one of ordinary skill in the art that many of the features, functions, processes, and materials described herein may be varied while remaining within the scope of the present disclosure. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. An electronic device, comprising:
a plurality of light-emitting units; and
an antenna disposed between the plurality of light-emitting units,
the antenna comprising first portions, turning portions, and second portions,
the first portions extending along a first direction,
the second portions extending along a second direction,
the turning portions connecting the first portions and the second portions,
wherein the first direction is perpendicular from the second direction,
wherein widths of the first portions are wider than widths of the second portions,
wherein widths of the first portions are equal and the widths of the second portions are equal,
wherein widths of the turning portion is gradually decreased from positions connecting the first portions toward positions connecting the second portions,
wherein the antenna has a labyrinth shaped adjoining non-enclosed strip structure,
the non-enclosed strip structure comprises two end terminals defining a start and an end of the labyrinth shaped adjoining non-enclosed strip structure,
the two end terminals are not connected to each other, and the two end terminals each have a rounded corner.

2. The electronic device as claimed in claim 1, wherein a ratio of a width of the first portion to a distance between two adjacent ones of the plurality of light-emitting units is ranged from 0.1 to 0.8.

3. The electronic device as claimed in claim 2, wherein the ratio of the width of the first portion to the distance between two adjacent ones of the plurality of light-emitting units is ranged from 0.2 to 0.6.

4. The electronic device as claimed in claim 1, wherein a width of the first portion is greater than a width of the second portion.

5. The electronic device as claimed in claim 1, wherein a first subpixel distance corresponding to the first portion is greater than a second subpixel distance corresponding to the second portion.

6. The electronic device as claimed in claim 1, further comprising a first substrate and a circuit layer disposed on the first substrate, wherein the plurality of light-emitting units are disposed on the first substrate and are electrically connected to the circuit layer.

7. The electronic device as claimed in claim 6, further comprising a plurality of second substrates disposed on the first substrate, wherein the plurality of second substrates partially overlap the antenna.

8. The electronic device as claimed in claim 1, wherein the antenna comprises a plurality of independent loop structures, and the plurality of independent loop structures are coaxial.

9. The electronic device as claimed in claim 2, wherein a ratio of a gap distance between the antenna and one of the plurality of light-emitting units to the distance between two adjacent ones of the plurality of light-emitting units is ranged from 0.05 to 0.75.

10. The electronic device as claimed in claim 2, wherein the antenna overlaps a midpoint of the distance between two adjacent ones of the plurality of light-emitting units.

11. The electronic device as claimed in claim 1, wherein a ratio of a width of the first portion to a width of one of the plurality of light-emitting units is ranged from 0.4 to 100.

12. The electronic device as claimed in claim 1, wherein a thickness of the antenna is less than a thickness of one of the plurality of light-emitting units.

13. The electronic device as claimed in claim 1, wherein the turning portion comprises a rounded corner, an angled corner, or a combination thereof.

14. The electronic device as claimed in claim 1, wherein one of the plurality of light-emitting units has a first subpixel area and another one of the plurality of light-emitting units has a second subpixel area different from the first subpixel area, and the antenna is disposed between the one of the plurality of light-emitting units having the first subpixel area and the another one of the plurality of light-emitting units having the second subpixel area.

15. The electronic device as claimed in claim 14, wherein the one of the plurality of light-emitting units having the first subpixel area is a LED, a quantum dot LED (QDLED), a mini LED, or a micro LED, and the another one of the plurality of light-emitting units having the second subpixel area is an OLED, or a QLED.

16. An electronic device, comprising:
a plurality of light-emitting units; and
an antenna disposed between the plurality of light-emitting units,
the antenna comprising a plurality of first portions and a plurality of second portions,
the plurality of first portions extending along a first direction,
the plurality of second portions extending along a second direction perpendicular from the first direction,
wherein two of the plurality of first portions and more than two of the plurality of second portions are connected together via turning portions to form a combined portion comprising a labyrinth shaped adjoining non-enclosed strip structure,
wherein widths of the first portions are wider than widths of the second portions,
wherein widths of the first portions are equal and the widths of the second portions are equal,
wherein widths of the turning portions are gradually decreased from positions connecting the first portions toward positions connecting the second portions,
the combined portion comprises a plurality of openings disposed therein, the plurality of openings are separated by the more than two of the plurality of second portions,
at least one of the plurality of light-emitting units is disposed in one of the plurality of openings,
the combined portion comprises two end terminals defining a start and an end of the structure,
the two end terminals are not connected to each other,
and the two end terminals each have a rounded corner.

* * * * *